United States Patent
Morrow et al.

(10) Patent No.: US 6,923,254 B2
(45) Date of Patent: Aug. 2, 2005

(54) WASHPIPE APPARATUS

(75) Inventors: Wesley C. Morrow, Houston, TX (US);
Jeffery J. Dinkel, Houston, TX (US);
Michael J. Kubinski, Houston, TX (US)

(73) Assignee: National-Oilwell, L.P., Houston, TX (US)

( * ) Notice: Subject to any disclaimer, the term of this patent is extended or adjusted under 35 U.S.C. 154(b) by 0 days.

(21) Appl. No.: 10/413,766

(22) Filed: Apr. 15, 2003

(65) Prior Publication Data

US 2004/0207159 A1 Oct. 21, 2004

(51) Int. Cl.[7] ............................................. E21B 19/00
(52) U.S. Cl. .................................... 166/88.4; 166/90.1
(58) Field of Search ............................. 166/88.4, 90.1, 166/84.1, 84.4

(56) References Cited

U.S. PATENT DOCUMENTS

| 2,394,800 A | | 2/1946 | Murphy | 285/97.1 |
|---|---|---|---|---|
| 2,459,472 A | | 1/1949 | Tremolada | 255/25 |
| 2,608,385 A | | 8/1952 | Stahl | 255/25 |
| 3,752,507 A | * | 8/1973 | Maurer et al. | 285/12 |
| 4,557,489 A | * | 12/1985 | Wentworth | 277/322 |
| 4,807,890 A | * | 2/1989 | Gorman et al. | 277/346 |
| 6,007,105 A | | 12/1999 | Dietle et al. | 285/94 |
| 2004/0035574 A1 | * | 2/2004 | Pippert | 166/90.1 |

FOREIGN PATENT DOCUMENTS

GB 694 230 7/1953

OTHER PUBLICATIONS

European Search Report for Application No. EP 04 25 2151 dated Jul. 15, 2004 (2 p.).

* cited by examiner

Primary Examiner—William Neuder
(74) Attorney, Agent, or Firm—Conley Rose, P.C.

(57) ABSTRACT

Methods and apparatus for providing enhanced seal life of a swivel seal assembly by decreasing the effective differential pressure across a given rotating seal. The differential pressure is decreased by providing a pressurized fluid on the low-pressure side of the seal at a predetermined fraction of the operating pressure of the swivel seal assembly. A preferred swivel seal assembly utilizes a washpipe and packing box that are rigidly affixed to their respective conduits such that misalignment and dynamic run-out is compensated for in the gap between the washpipe and the packing box. A control system monitors and regulates the pressurized fluid supplied to the assembly.

17 Claims, 3 Drawing Sheets

WASHPIPE APPARATUS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

The present invention relates generally to methods and apparatus for providing high pressure fluid communication between relatively rotatable, generally coaxial conduits, and in particular to washpipe assemblies such as those used in rotary drilling swivels.

Rotary drilling swivels generally include a washpipe that sealingly engages a set of circumferential seals contained within a seal housing. Frequently, the washpipe remains stationary while the seals and the seal housing rotate. Swivel seal assemblies have conventionally included a series of reinforced, elastomeric, chevron-type seals interspersed with a series of reinforcing back-up rings. Generally, one seal is exposed to full hydraulic pressure on one side, and atmospheric pressure on the opposite side. These seals tend to function in a redundant manner, wherein the full differential pressure of the mud acts on one seal until that seal fails and the next seal in the assembly acts as the primary seal.

The rotating components of the swivel are often subject to some amount of radial misalignment, or dynamic run-out, due to tolerances and inherent operating conditions. Dynamic run-out between the washpipe and the seal housing has normally been compensated for by means of the seal extrusion gap between the two rotating components since most conventional swivel designs have both the washpipe and the seal housing radially fixed relative to their respective mountings. Some prior art swivel designs have sought to compensate for potential run-out and offset problems by allowing the washpipe and the seal housing to articulate.

Current drilling technology has increased the desired operating pressure of rotary drilling swivel seal assemblies to very high pressures. Many conventional swivel seal designs have yielded less than desirable seal life or displayed other unsatisfactory performance in these high-pressure environments. Thus, there remains a need in the art for methods and apparatus for swivel seal assemblies that can withstand high pressures for extended periods of time. Therefore, the embodiments of the present invention are directed to methods and apparatus for swivel seal assemblies that seek to overcome the limitations of the prior art.

SUMMARY OF THE PREFERRED EMBODIMENTS

Accordingly, there are provided herein methods and apparatus for increasing the sealing life of a swivel seal assembly by decreasing the effective differential pressure across a given rotating seal. The effective differential pressure is decreased by providing a pressurized fluid on the low-pressure side of the seal at a predetermined fraction of the operating pressure of the swivel seal assembly. A preferred swivel seal assembly utilizes a washpipe and packing box that are rigidly affixed to their respective conduits. The radial misalignment and dynamic run-out is compensated for by the seal extrusion gap between the washpipe and the metal backing surfaces.

One preferred embodiment includes a swivel sealing assembly having a washpipe rigidly mounted to a rotating conduit and a packing box rigidly mounted to a stationary conduit. The packing box engages the washpipe such that a circulating fluid flows through the washpipe and packing box at an elevated pressure. A plurality of seals are contained within the packing box and adapted to seal against the washpipe and the packing box forming a plurality of annular volumes defined by the sealing interfaces between the washpipe, the packing box, and two adjacent seals. One or more pressure ports provide fluid access to one or more of the plurality of annular volumes. A pressure control system is adapted to provide pressurized fluid to the pressure ports at a predetermined fraction of the elevated pressure of the circulating fluid.

An alternative embodiment includes a method for increasing the life of a swivel seal assembly having a plurality of seals contained with a packing box and adapted to seal against a washpipe by monitoring the internal pressure of the swivel seal assembly, wherein the packing box is rigidly mounted to a stationary conduit and the washpipe is rigidly mounted to a rotating conduit, providing a pressurized fluid at a first fraction of the swivel seal internal pressure to a first annular volume between adjacent seals, and providing a pressurized fluid at a second fraction of the swivel seal internal pressure to a second annular volume between adjacent seals.

Thus, the present invention comprises a combination of features and advantages that enable it to extend the useful life of a swivel seal assembly by regulating the differential pressure across the rotating seals. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
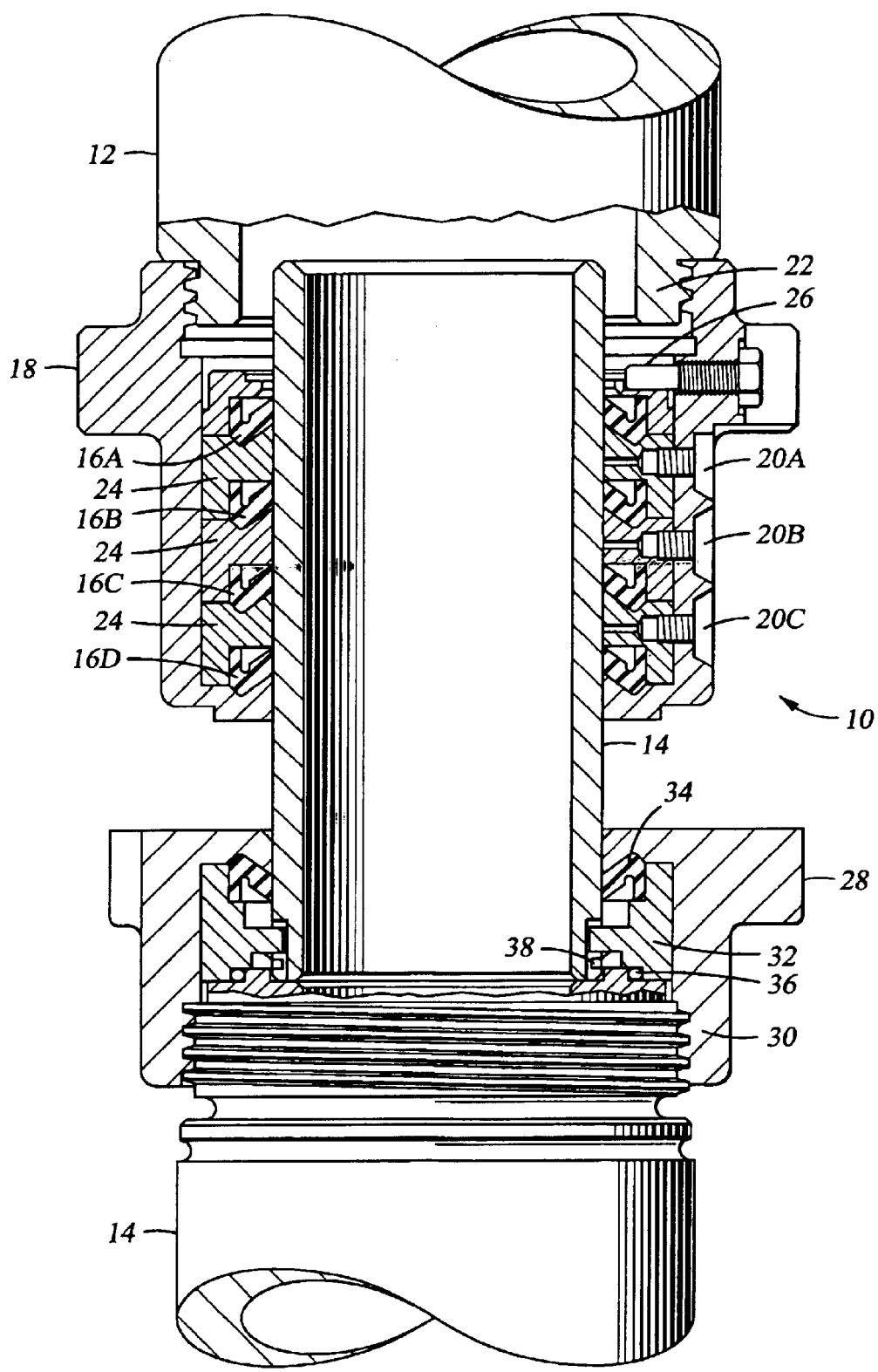
FIG. 1 is a partial cross-sectional view of a swivel seal assembly.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for sealing between a rotating conduit and a non-rotating conduit. The concepts of the invention are discussed in the context of a rotary swivel seal assembly but the use of the concepts of the present invention is not limited to swivel seal assemblies and may find application in other rotating applications, both within oilfield technology and other high pressure, heavy duty applications to which the concepts of the current invention may be applied.

In the context of the following description, the terms "rigid" or "substantially stationary" should be taken to mean a relationship in which two connected components are generally fixed relative to each other. It is understood that due to manufacturing, assembly, or other design details the two components may have some relative movement. The pressures referred to herein are pressures relative to ambient pressure, so 0 psi should be taken to mean ambient pressure.

FIG. 1 shows a partial sectional view of one embodiment of a washpipe assembly 10 including rotating conduit 11 and stationary conduit 12. Nut 28 is connected to rotating conduit 11 and holds washpipe 14 in rigid engagement with the rotating conduit. Washpipe 14 extends from rotating conduit 11 into a sealing engagement with rotary swivel seals 16A–D that are contained within packing box 18 attached to stationary conduit 12. Packing box 18 is rigidly attached to stationary conduit 12 by threaded connection 22.

Rotary swivel seals 16A–D and spacers 24 are disposed within box 18. Rotary swivel seals 16A–D are preferably constructed from a resilient, compliant seal material such as fiber backed nitrile. Spacers 24 are preferably constructed from substantially rigid material such as alloy steel, and act as a rigid backup to the seal. Rotary swivel seals 16A–D are generally unidirectional seals designed to hold pressure in only one direction, such as chevron-type seals. Other seal designs may be used as long as the seals do not require an elevated hydraulic pressure above the working pressure of the washpipe assembly or posses a special configuration that pumps fluid across the sealing face that acts as a lubricant.

The threaded connection 22 between stationary conduit 12 and packing box 18 rigidly connects the box 18 to the conduit 12 and compresses seals 16A–D and spacers 24. The compression of seals 16A–D energizes and expands the seals to form a sealing engagement with washpipe 14. Seal 26, preferably an o-ring type seal, is compressed between the uppermost spacer 24 and the stationary conduit 12 and seals against the internal pressure of stationary conduit 12. Thus, once packing box 18 is installed, the fluid pressure inside the stationary conduit 12 is contained by static seal 26 and rotating seals 16A–D.

Washpipe 14 is held in place by holding nut 28 that attaches to conduit 11 by threaded connection 30. Holding nut 28 also fixes in place holding ring 32 that carries seals 34 and 36 as well as snap ring 38. Holding nut 28 compresses seal 34 to energize and expand the seal against washpipe 14. Holding ring 32 compresses seal 36 against the rotating conduit 11 forming a static seal. Seals 34 and 36 act to isolate the elevated internal pressure of the swivel from external, atmospheric pressure. Seals 34 and 36 are respectively similar to seals 16A–D and 26 described above. Snap ring 38 maintains the relative axial positions of washpipe 14 and holding ring 32 during the installation process. The radial clearance between washpipe 14 and nut 28 is limited so as to hold the washpipe substantially stationary relative to conduit 11. The preferred radial clearance between washpipe 14 and nut 28 typically is between 0.020" and 0.025" on diameter.

Because the washpipe 14 and the rotary swivel seals 16A–D in packing box 18 are both substantially stationary relative to their respective conduits, any potential dynamic run-out between the rotating and non-rotating components is compensated for in the radial gap between the washpipe and the spacers. This radial gap defines the extrusion gap across which seals 16A–D act to contain the internal pressure in the assembly. Therefore, the inside diameter of box 18 and spacers 24 are preferably sized so as to permit some amount of radial offset or run-out between the conduits while maintaining an extrusion gap across which seals 16A–D can operate. In the preferred embodiments, this extrusion gap is between 0.01" and 0.015", and preferably approximately 0.013".

The performance of rotating seals 16A–D is also greatly effected by the differential pressure across each seal. Pressure ports 20A–C are provided so that the pressure differential across seals 16A–D can be regulated. Pressure ports 20A–C provide hydraulic access to the annular pressure volumes between adjacent seals 16A–D. The annular pressure volumes are defined by the sealing interfaces between two adjacent seals, for example 16A and 16B, and the washpipe 14 and the packing box 18.

In the preferred embodiments, pressure ports 20A–C are used to inject a pressurized fluid into the annular volumes between the seals 16A–D. The pressurized fluid is preferably injected at a pressure above ambient pressure but below the internal pressure of swivel 10. In other embodiments, the pressure between each seal 16A–D is regulated such that each of the seals see substantially the same differential pressure. The pressurized fluid is not injected at a pressure higher than the swivel internal pressure, which would cause injected fluid to be forced across the seal face. Such an over-pressurization of fluid in order to lubricate and energize the seal face is an important feature of certain prior art applications that sought to use hydrodynamic sealing elements.

Figure 2:
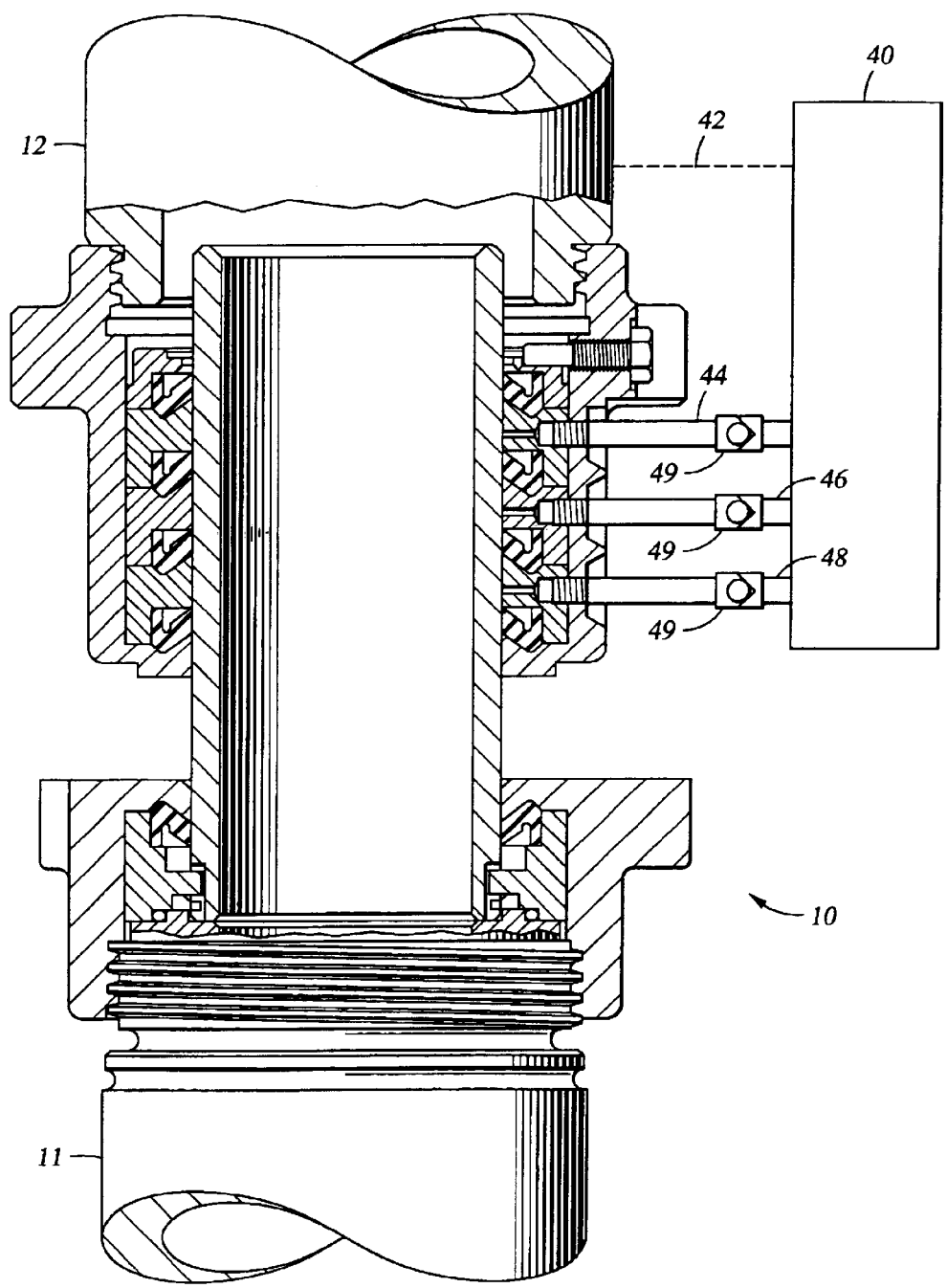
FIG. 2 is a partial cross-sectional view of a swivel seal assembly with a pressure control system.

FIG. 2 is a general schematic drawing illustrating a preferred swivel seal assembly 10 coupled with a pressure control system 40. Pressure control system 40 monitors the internal pressure in swivel assembly 10 via line 42, and, according to predetermined operating parameters, supplies pressurized hydraulic fluid through control lines 44, 46, and 48 to pressure ports 20A–C. In some embodiments, control system 40 may monitor the resulting pressure differentials across the seals 16A–D, in order to provide early detection of leakage and potential seal failure. Control lines 44, 46, 48 may also include check valves 49 to prevent fluid from flowing from swivel assembly 10 to control system 40. Check valves 49 maintain a volume of hydraulic fluid in assembly 10 to serve as seal lubrication in case of loss of pressure from control system 40 and prevent elevated pressure from traveling up the control lines to the control system.

Figure 3:
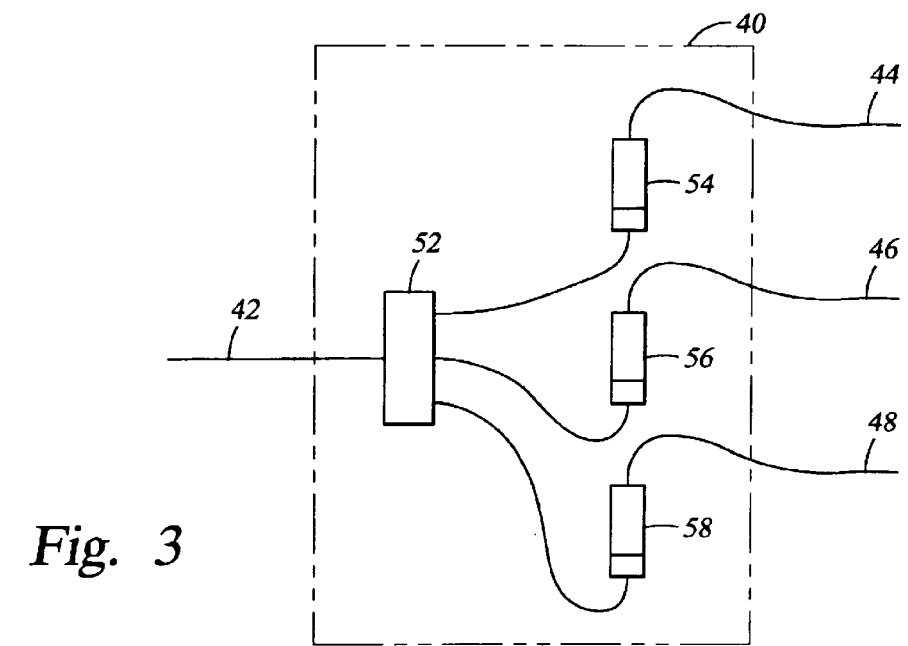
FIG. 3 is a schematic view of one embodiment of a pressure control system.

FIG. 3 illustrates on embodiment of a control system 40 that uses a plurality of pressure reducing cylinders 54, 56, 58, to regulate the pressure between the rotating seals 16A–D. Internal fluid pressure from the swivel assembly 10 is distributed to the pressure reducing cylinders 54, 56, 58 by manifold 52. Each cylinder 54, 56, 58 takes the hydraulic pressure input from the manifold 52 and produces an output hydraulic pressure at some predetermined percentage of the input pressure.

For example, in one embodiment, swivel assembly 10 has an internal pressure of 4000 psi. Manifold 52 distributes 4000 psi fluid to each of the reducing cylinders 54, 56, and 58. Cylinder 54 is chosen to provide a fluid pressure that is 0.75 times the swivel internal pressure. Therefore, cylinder 54 provides a 3000 psi fluid through hose 44 and port 20A to the annular volume between the seal 16A and seal 16B. Cylinder 56 provides a fluid pressure that is 0.5 times the swivel internal pressure, thus providing a 2000 psi fluid through hose 46 and port 20B to the annular volume between the seal 16B and seal 16C. Cylinder 58 provides a fluid pressure that is 0.25 times the swivel internal pressure, thus providing a 1000 psi fluid through hose 48 and port 20C to the annular volume between seals 16C and seal 16D.

Thus, the swivel internal pressure is 4000 psi, the pressure in the annular volume between seals 16A and 16B is 3000 psi, the pressure in the annular volume between seals 16B and 16C is 2000 psi, the pressure in the annular volume between seals 16C and 16D is 1000 psi, with the external pressure being 0 psi. Therefore, in the particular example set forth, each rotary swivel seal 16A–D sees a differential pressure of only 1000 psi. This can be compared to most of the prior art systems in which one seal sees the full swivel internal pressure on one side and atmospheric pressure on the other side, which in this case would be a 4000 psi differential.

Figure 4:
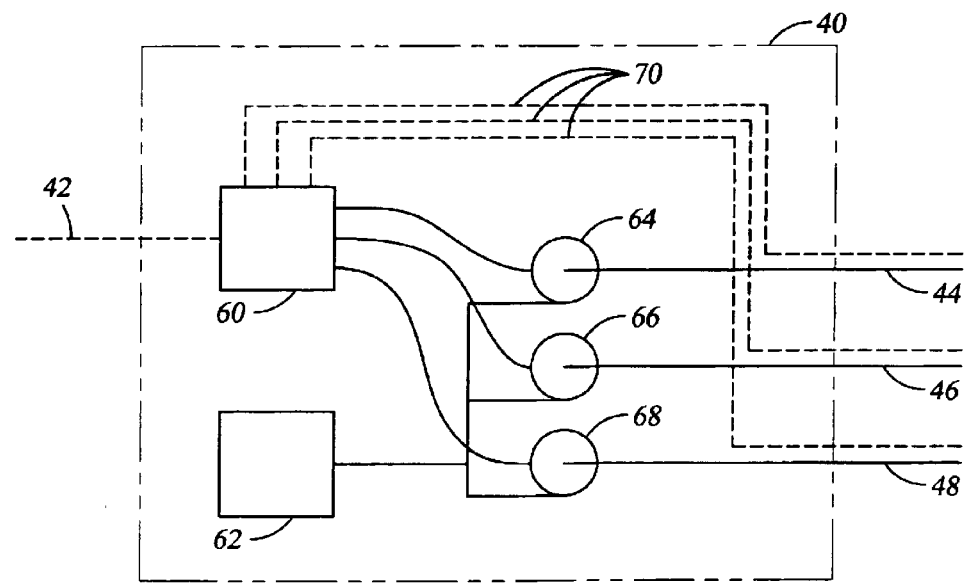
FIG. 4 is a schematic view of an alternate embodiment of a pressure control system.

FIG. 4 illustrates an alternative embodiment of a control system 40 that utilizes an electronic control system 60 to regulate hydraulic pumps 64, 66, 68 that supply fluid to the pressure ports. Control system 60 receives data via line 42 from a pressure transducer, or other device, measuring the swivel internal pressure. Control system 60 then activates pumps 64, 66, and 68 as desired. The pumps draw fluid from a reservoir 62 and supply the pressurized fluid into the annular volume between adjacent rotary seals. In one embodiment, control system 60 may supply pressure such that the pressure in each annular volume is equal and differential pressure across each seal, other than the seal exposed to ambient pressure, is balanced. Control system 60 may also be used to regulate the internal pressure as described above such that the differential pressure across each seal is equal.

Control system 60 may also be adapted to receive, by way of signal lines 70, pressure information from pressure transducers, or other devices, reading the pressure within each one of the annular pressure areas. These additional readings could be used to sense pressure fluctuations and warning of impending seal failures. In the event of a seal failure, control system 60 could activate the pumps to adjust the differential pressure across the still intact seals.

Although the above described embodiments act to reduce the differential pressure across individual rotary swivel seals 16A–D, it is preferred that the seals be chosen to be able to withstand full operating pressure in the case of failure or temporary inoperability of the pressure control system 40 or 60. Because the preferred embodiments utilize standard seal configurations not requiring hydrodynamic seal energization, these embodiments will continue to perform, although with a reduced life cycle, without the reduced differential pressure provided by the control system 40 or 60.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A swivel sealing assembly comprising:
   a washpipe rigidly mounted to a rotating conduit;
   a packing box rigidly mounted to a stationary conduit and engaging said washpipe, wherein a circulating fluid flows through said washpipe and said packing box at an elevated pressure greater than ambient pressure;
   a plurality of seals contained within said packing box and adapted to seal against said washpipe and said packing box;
   a plurality of annular volumes defined by the sealing interfaces between said washpipe, said packing box, and two adjacent seals;
   a control system adapted to provide pressurized fluid to one or more of said plurality of annular volumes at a predetermined fraction of the elevated pressure of the circulating fluid; and
   a plurality of spacers within said packing box.

2. The assembly of claim 1 wherein a radial gap is formed between said washpipe and said spacers and said plurality of seals act across the radial gap.

3. The assembly of claim 2 wherein any offset between said washpipe and said packing box is compensated for in the radial gap.

4. The assembly of claim 1 wherein said spacers are constructed from a rigid material and said seals are constructed from a resilient material.

5. The assembly of claim 1 further comprising a plurality of pressure ports providing fluid access to one or more of said plurality of annular volumes, wherein said control system provides pressurized fluid to the annular volumes via said pressure ports.

6. The assembly of claim 1 wherein the pressurized fluid is supplied at a pressure between ambient pressure and the elevated pressure of the circulating fluid.

7. The assembly of claim 1 wherein each of said plurality of seals is subjected to a substantially equivalent differential pressure.

8. The assembly of claim 1 wherein each of the plurality of annular volumes is maintained at the same pressure.

9. A swivel sealing assembly comprising:
   a washpipe rigidly mounted to a rotating conduit;
   a packing box rigidly mounted to a stationary conduit and engaging said washpipe, wherein a circulating fluid flows through said washpipe and said packing box at an elevated pressure greater than ambient pressure;
   a plurality of seals contained within said packing box and adapted to seal against said washpipe and said packing box;
   a plurality of annular volumes defined by the sealing interfaces between said washpipe, said packing box, and two adjacent seals;
   a control system adapted to provide pressurized fluid to one or more of said plurality of annular volumes at a predetermined fraction of the elevated pressure of the circulating fluid; and
   check valves in between the annular volumes and said control system.

10. A swivel comprising:

a stationary portion having a packing box extending therefrom;

a rotary portion having a washpipe extending therefrom and adapted to engage the packing box;

a plurality of seals adapted to seal between the packing box and the washpipe such that a circulating fluid can flow between said stationary and said rotary portions;

a plurality of annular volumes defined by the engagement of two adjacent seals between the packing box and the washpipe;

a control system adapted to provide a pressurized fluid to said plurality of annular volumes at a pressure in between ambient pressure and the pressure of the circulating fluid; and a plurality of spacers alternatingly arranged with said plurality of seals within said packing box.

11. The assembly of claim 10 wherein said plurality of seals act across a radial gap formed between the washpipe and said spacers.

12. The assembly of claim 11 wherein any offset between said washpipe and said packing box is compensated for in the radial gap.

13. The assembly of claim 10 wherein said spacers are constructed from a rigid material and said seals are constructed from a resilient material.

14. The assembly of claim 10 further comprising a plurality of pressure ports providing fluid access to one or more of the plurality of annular volumes, wherein said control system provides pressurized fluid to the annular volumes via said pressure ports.

15. The assembly of claim 10 wherein each of said plurality of seals is subjected to a substantially equivalent differential pressure.

16. The assembly of claim 10 wherein each of the plurality of annular volumes is maintained at the same pressure.

17. A swivel comprising:

a stationary portion having a packing box extending therefrom;

a rotary portion having a washpipe extending therefrom and adapted to engage the packing box;

a plurality of seals adapted to seal between the packing box and the washpipe such that a circulating fluid can flow between said stationary and said rotary portions;

a plurality of annular volumes defined by the engagement of two adjacent seals between the packing box and the washpipe;

a control system adapted to provide a pressurized fluid to said plurality of annular volumes at a pressure in between ambient pressure and the pressure of the circulating fluid; and check valves in between the annular volumes and said control system.

* * * * *